(12) United States Patent
Padmore et al.

(10) Patent No.: US 8,756,772 B2
(45) Date of Patent: Jun. 24, 2014

(54) ADJUSTABLE CLIP

(76) Inventors: David Padmore, Oxford (GB); Dale James Barrett, Oxford (GB)

( * ) Notice: Subject to any disclaimer, the term of this patent is extended or adjusted under 35 U.S.C. 154(b) by 603 days.

(21) Appl. No.: 13/034,489

(22) Filed: Feb. 24, 2011

(65) Prior Publication Data

US 2011/0232043 A1 Sep. 29, 2011

(30) Foreign Application Priority Data

Feb. 24, 2010 (GB) .................................. 1003108.6

(51) Int. Cl.
*F16L 3/02* (2006.01)
*F16G 11/00* (2006.01)
*H02G 3/02* (2006.01)

(52) U.S. Cl.
USPC ............. 24/527; 24/522; 24/591.1; 24/593.1; 174/135; 174/68.1; 174/68.3; 174/101; 174/66

(58) Field of Classification Search
USPC ............ 24/522, 591.1, 593.11; 174/72 A, 66, 174/135, 101, 68.1, 68.3; 403/49
See application file for complete search history.

(56) References Cited

U.S. PATENT DOCUMENTS

| 3,425,099 A * | 2/1969 | Lehoczky ........................ 24/527 |
| 7,537,477 B2 * | 5/2009 | Crossman et al. ............. 174/135 |
| 2008/0307741 A1 * | 12/2008 | Comerford et al. ............. 403/49 |

FOREIGN PATENT DOCUMENTS

| EP | 1744424 A1 | 1/2007 |
| EP | 1850434 A1 | 10/2007 |

OTHER PUBLICATIONS

Search Report in priority application GB 1003108.6, Jul. 13, 2010.

* cited by examiner

*Primary Examiner* — Robert J Sandy

(57) ABSTRACT

A clip 10 is provided for the retention of cables or wiring 44 in electrical installation trunking 46. The clip 10 has a first member 12 and a second member 14, which are coupled together in a sliding relationship. In use, the clip 10 slides apart, extending across the open face 50 of the trunking 46 until the lateral ends of the clip abut against an internal side wall 52 of the trunking 46. Cooperating locking strips (26, 40, see FIGS. 3 and 4) act to lock the relative positions of the first 12 and second 14 members and to prevent the clip 10 from falling out of the trunking 46.

16 Claims, 3 Drawing Sheets

ADJUSTABLE CLIP

ADJUSTABLE CLIP

The present invention relates to an adjustable clip and particularly but not exclusively to an adjustable clip for retaining cables, such a power cables, telephone cables and the like within trunking.

BACKGROUND TO THE INVENTION

Electrical installation trunking is commonly used, for example in domestic, industrial, academic, military, government, office and public environments for holding and positioning cables and wires. The trunking, which is commonly formed as a U-shaped channel, is fastened to the building infrastructure. Cables are inserted into the trunking and are sometimes retained by clips, before a cover is attached to the U-shaped channel.

Without clips, the cabling has a tendency to sag under its own weight out of the trunking, making it difficult for the installer to fit the cover. When fitting the trunking to a ceiling, for example, the cables tend to drop out of the trunking and clips are required to retain the cabling. This problem occurs whether trunking and cabling are being fitted during an initial installation, or at a later date when additional cabling is being added into existing trunking. Clips are located at intervals along the length of the trunking to provide support to the cabling before the cover is finally attached.

In industrial applications, metal trunking is used. For example, in the construction of new buildings, metal trunking or conduit is often sunk into masonry and attached thereto by screws. In other applications such as lighting and retrofit cable distribution, the trunking may be suspended from the building infrastructure. This typically means that cable insertion is carried out above ground and sometimes at arm's reach. Fitting clips that require use of a tool can be awkward and generally slows down the pace of an installation, especially if the installer is trying to fit a clip with one hand whilst holding the cabling within the trunking with his other hand.

By contrast, PVC trunking tends to be used more for holding and positioning cables where the aesthetics of the trunking are important, for example on walls and ceilings, and adjacent to skirting boards. PVC trunking is usually surface mounted and due to its lightness can be fastened with self-adhesive strips. PVC trunking covers are commonly attached to the U-shaped channel with a snap-fit assembly. Each U-shaped channel has a base and a pair of sidewalls each terminating in an inwardly facing flange. In a PVC snap-fit assembly, the inwardly facing flange may be angled or perpendicular to the side walls and the edges of the cover engage the flanges with a snap-fit.

Snap-fit arrangements can be found in metal trunking but metal trunking covers are more often attached to the base using a screw arrangement, such as a turnbuckle, or some other mechanical means. To lock the cover in place on the base, a screwdriver is used to turn the turnbuckle until the turnbuckle rotates into position underneath the flange. A problem with this type of arrangement is that when the trunking is full of cables or wires, the turnbuckle can damage any cables or wires proximate the flange, especially because the turnbuckle may be made from metal. This can potentially lead to short-circuits within the trunking when the cables are eventually in operation.

Currently, available clips generally used in plastic trunking, take the form of resilient C-shaped members, which are inserted whilst in a compressed state into the trunking and which then flex back into their natural position, wedging under the flanges of the trunking. In this way, the cables are retained within the trunking. A disadvantage of the C-shape is that it significantly reduces the available capacity within trunking for the cabling. Also, each clip is suitable for use with only one width of trunking. This means that for any particular job, the installer must transport quantities of each size of clip in case they are required for fitment with a range of sizes of trunking.

It is an object of the invention to provide an adjustable clip which reduces or substantially obviates the above mentioned problems.

SUMMARY OF INVENTION

According to a first aspect of the present invention there is provided an adjustable clip for the retention of cables within a channel section trunking, comprising a first member and a second member, the first and second members being moveable relative to one another for adjusting the length of the clip across the opening of the channel section trunking in use, and cooperating formations being provided on each of the first and second members enabling the locking together of the first and second members in substantially any relative position.

The clip is advantageous because it can be used on all standard and non-standard sizes of electrical installation trunking, regardless of the orientation of the trunking.

The first member is preferably slidably moveable relative to the second member. In this way, the clip is compact, making it easy to store. In use, the clip occupies relatively little space within the trunking compared to currently available clips, which maximises the amount of space available for cabling. No tools are required to operate the clip.

The second member may have a substantially U-shaped lateral cross-section, including a base and a pair of longitudinal flanges extending along respective edges of the base.

A tongue may be provided on each longitudinal edge of the first member and a corresponding recess may be provided on an inner face of each longitudinal flange of the second member, each tongue sliding within a respective recess. Since the first member is positively engaged with the second member, this eliminates the risk of the first and second members becoming separated and possibly lost during storage, transportation and installation.

The first and second members may be substantially curved in lateral cross-section. A curved cross-section is advantageous because it reduces the area of the clip that may come into contact with proximate cabling. This reduces the risk of cable damage, for example, as sometimes occurs with turnbuckles and other types of metal clips. This is particularly important, when feeding cables behind the clips, because snagging of the cables can cause damage, which is substantially avoided in use of the invention.

The cooperating formations are preferably provided as a series of spaced ridges providing peaks and troughs, the peaks of the first member being nestable in the troughs of the second member. The series of ridges may be provided each on a rear surface of the first member facing the second member and on a front surface of the second member facing the second member. Each ridge in the series of ridges may be a protrusion extending across a portion of the width of the clip, between each longitudinal edge of the first and second members respectively. The ridges are preferably integrally formed with the respective member for ease of manufacturing.

Each series of ridges is optionally positioned centrally across the width of the clip and may be symmetrical about the centre of the clip. This ensures that when the clip moves between its closed position and any open position, the first and second members travel in alignment with each other in a balanced way, which prevents jamming of the movement.

Each series of ridges may extend along the entire length of the clip. This is beneficial as it means that the clip remains usefully functional even at its most fully open position, that is, even when the first member is substantially fully extended with respect to the second member, the clip can be used to retain cables within trunking.

A finger-well is ideally provided on the front surface of the first member for facilitating sliding of the first member relative to the second member. This means that the clip can be positioned and operated by a single hand whilst the installer uses his other hand to hold a portion of cabling in place within the trunking.

The finger-well may be integrally formed in the first member. This reduces the number of components within the clip, making it cheaper to manufacture.

The length of the first member may be between 50 and 200 mm. Preferably the length of the first member is 50, 100 or 200 mm. This makes the clip particularly suitable for use with standard sized trunking that is from 50 to 300 mm wide.

The length of the first member may be different to the length of the second member, thereby extending the possible reach of the clip. However, the length of the first member may be the same as the length of the second member, which means that the first and second members act as protection for each other during storage and transportation.

It is envisaged that the clip may be made from moulded plastics. This keeps the weight of the clip low and means that the clip is resistant to corrosion.

According to a second aspect of the invention, there is provided a cable retainer system comprising a channel section trunking and an adjustable clip according to the first aspect of the invention.

The channel section trunking may have a rear wall, side walls, and internally facing flanges provided along the edges of the side walls, behind which the or each adjustable clip can be retained.

The channel section trunking may be made from metal or plastics.

BRIEF DESCRIPTION OF THE DRAWINGS

For a better understanding of the present invention, and to show more clearly how it may be carried into effect, reference will now be made, by way of example, to the accompanying drawings, in which.

DESCRIPTION OF PREFERRED EMBODIMENTS

Figure 1:
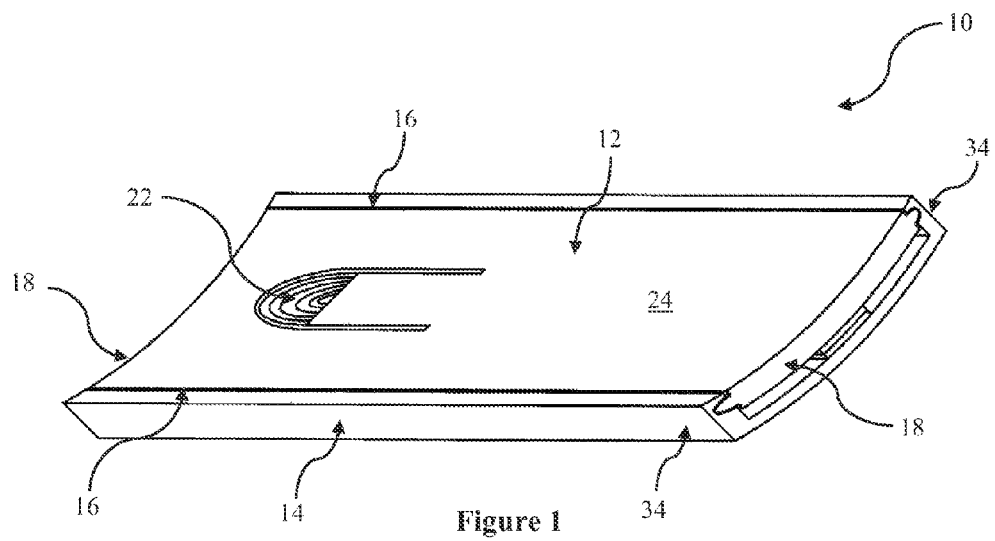
FIG. 1 shows a schematic perspective view of a clip in a closed position.
Figure 2:
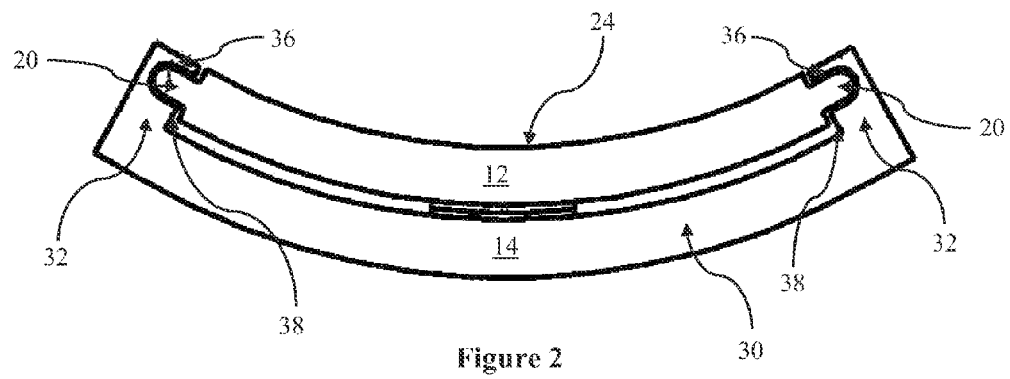
FIG. 2 shows a schematic sectional view of the clip of FIG. 1, showing in particular the tongue and slot arrangement of the first and second members respectively.

Referring firstly to FIGS. 1 and 2, a clip for the retention of cables within electrical installation trunking is indicated generally at 10. The clip 10 includes a first member 12 and a second member 14. The first member 12 is slidably mounted to the second member 14 for the purpose of adjusting the length of the clip 10, for placement within the open side of electrical trunking of different sizes.

The first member 12 is substantially rectangular, and has a pair of parallel longitudinal sides 16 and two lateral ends 18. A semi-circular tongue or protrusion 20 extends along each longitudinal side 16 of the first member 12. A finger-well 22 is provided on a front surface 24 of the first member 12 for facilitating sliding of the first member 12 relative to the second member 14, as described in further detail below. The length, width and depth of the first member 12 are, in one size, approximately 50 mm by 20 mm by 2 mm respectively. The length of the clip may also be 100 mm and 200 mm for use in standard sized trunking.

Figure 3:
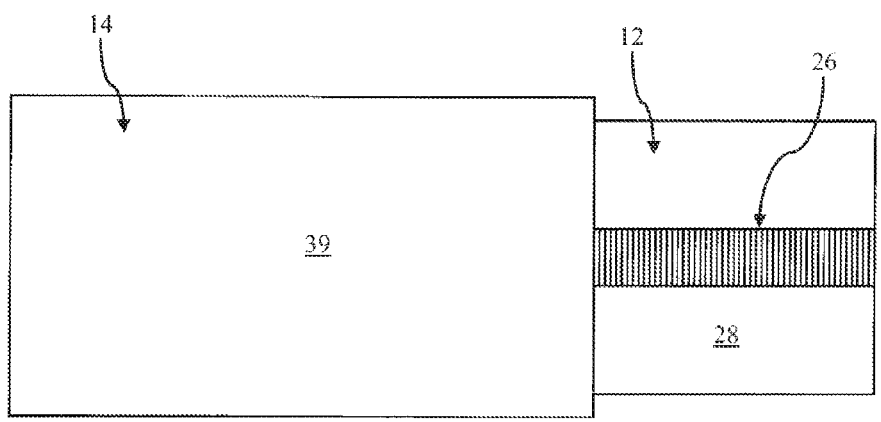
FIG. 3 shows a schematic bottom plan view of the clip of FIG. 2 in an engaged position.

Referring also to FIG. 3, a series of spaced ridges providing peaks and troughs are provided in a locking strip 26 extending longitudinally of the first member 12, along its central axis. The locking strip 26 is located on a rear side 28 of the first member 12 and extends only partially across the width of the first member. The locking strip 26 is raised from the general surface of the rear side 28. In other words, it stands slightly proud of the surface.

As best seen in FIG. 2, the second member 14 has a substantially U-shaped lateral cross-section, with a substantially rectangular base 30 and a flange 32 extending along each longitudinal side 34. A longitudinally extending semi-circular recess or slot 36 is provided on an inner face 38 of each flange 32 for receiving a respective tongue 20 of the first member 12. Alternative tongue and slot profiles may equally be used to achieve a mating engagement, provided that relative sliding movement between the first 12 and second 14 members is still possible. The length, width and depth of the second member 14 are, for example, approximately 50 mm by 30 mm by 4 mm respectively.

The first 12 and second members 14 are both curved in lateral cross-section. A rear surface 39 of the second member 14 faces into the trunking in use, thus presenting the curved surface to cables held therein. The curvature reduces the potential area of the second member 14 that comes into contact with proximate cables, thereby reducing the risk of damage caused to cables by the clip 10. In use, as the installer feeds cables into the trunking, less resistance is provided by the clips 10 to the cables. The rear surface 39 may optionally be coated with a low friction film, to improve mobility of cables within the trunking when there are already many cables in place.

Figure 4:
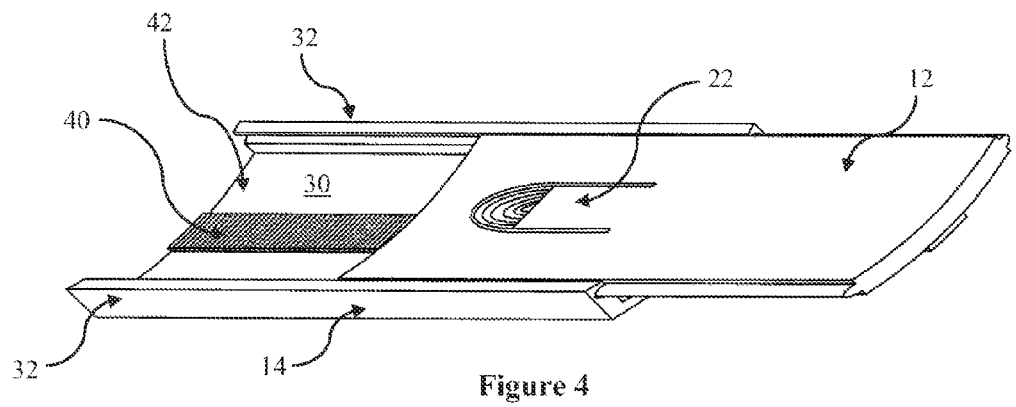
FIG. 4 shows a schematic perspective view of the clip of FIG. 1 in an engaged position.

Referring to FIG. 4, a series of spaced ridges providing peaks and troughs are provided in a locking strip 40 on a front surface 42 of the base 30, between the flanges 32. The locking strip 40 is longitudinally aligned with and symmetrical about the central axis of the base 30 and extends only partially across the width of the base. The locking strip 40 is raised from the front surface 42. In other words, it stands slightly proud of the surface.

The first member 12 and the second member 14 are coupled together in a sliding relationship. The tongues 20 of the first member 12 engage and slide in the respective recesses 36 of the second member 14. The locking strip 26 of the first member 12 is aligned with the locking strip 40 of the second member 14, and the two locking strips 26, 40 face and engage each other. The peaks of locking strip 26 nestle into the troughs of locking strip 40, and vice versa and lock the members together thus preventing unintentional sliding of members relative to one another.

The finger-well 22 is formed integrally with the first member 12. This is beneficial as it reduces the number of components within the clip 10, making the clip 10 simple and cheap to manufacture. Since the finger-well 22 is formed as a recess in the front surface 24 of the first member 12, i.e. the profile of the finger-well 22 does not extend outwardly beyond the front surface 24, the finger-well 22 does not interfere with the subsequent fitting of any trunking cover. The surface of the finger-well 22 may be graduated or ribbed for additional grip.

The clip 10 is made from moulded PVC plastics, although other suitable materials and manufacturing techniques may also validly be used.

Figure 5:
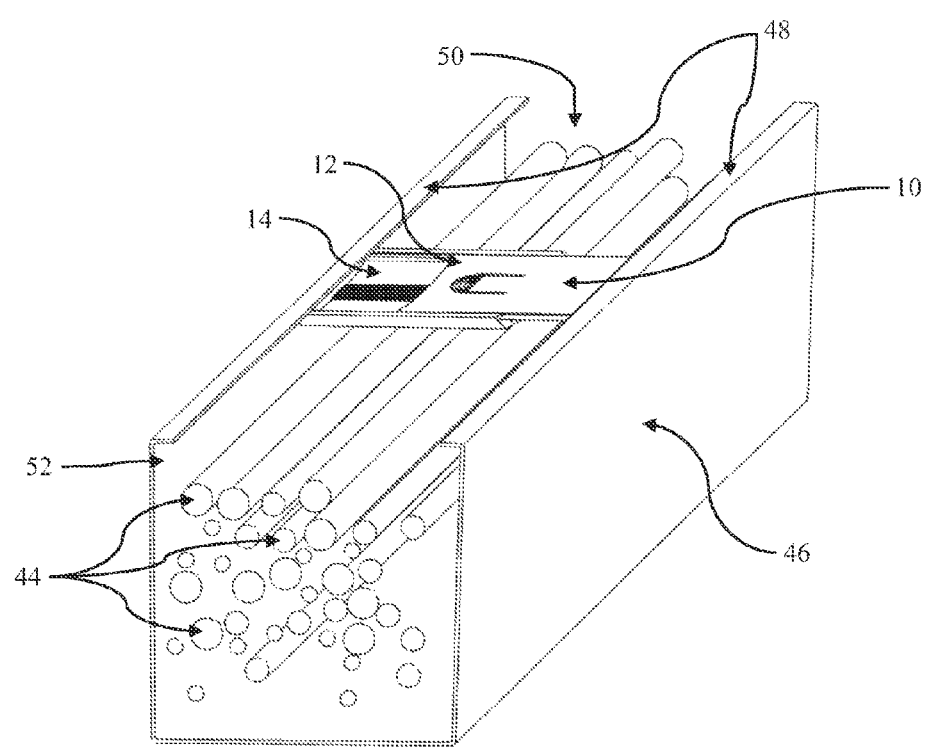
FIG. 5 shows a schematic perspective view of a clip in use within a length of trunking.
Figure 6:
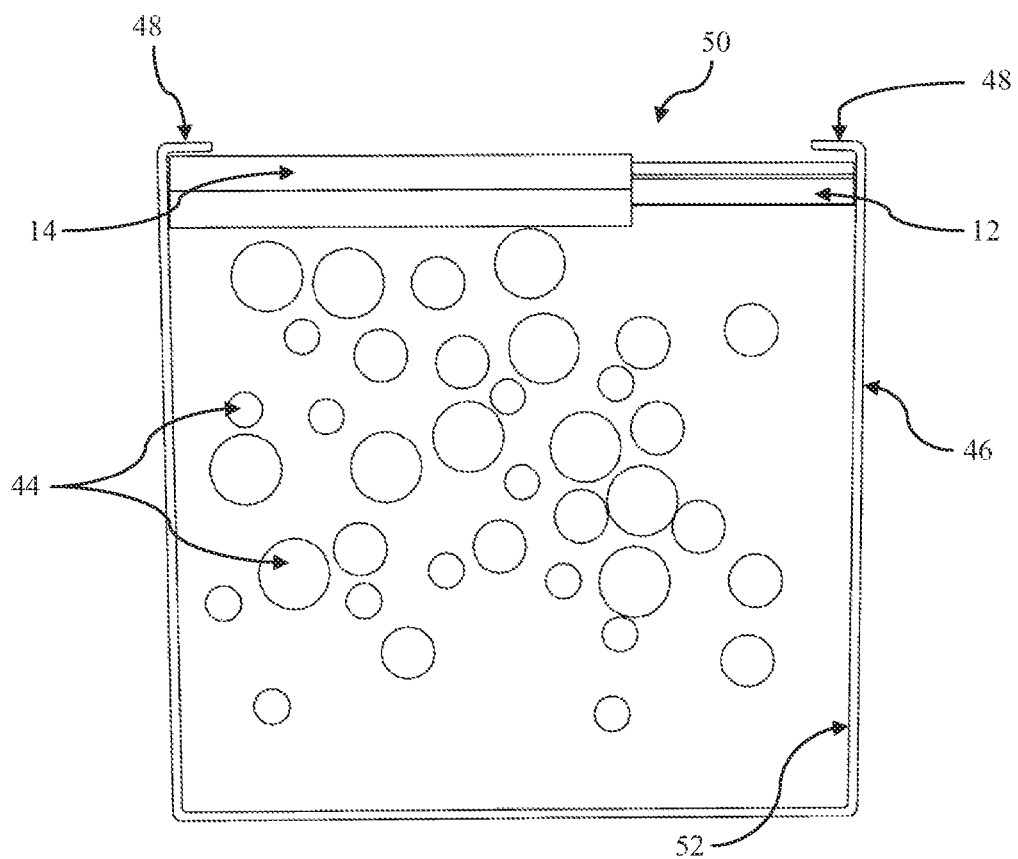
FIG. 6 shows a schematic sectional view of the clip of FIG. 5, in use within trunking.

In use, as shown in FIGS. 5 and 6, a plurality of cables 44 is placed within a length of electrical installation trunking 46. The trunking 46 has a channel cross-section, terminating in a pair of inwardly facing longitudinal flanges 48.

To retain the cables 44 in place as they are laid into the trunking 46, a clip 10 is inserted into the open face 50 of the trunking 46. Since the lateral ends of the clips 10 are flat, the installer of the trunking 46 and clip 10 can slide the clip 10 easily along the length of trunking 46 to reach the desired location. The installer places his thumb into the finger-well 22 whilst gripping the second member 14 and pushes the first 12 and second 14 members apart until the ends of the clip 10 abut against the internal side wall 52 of the trunking, thereby attaining an engaged position. The co-operating locking strips can be moved relative to one-another by hand by the application of force, but when the force is removed, the formations on the locking strips 26,40 engage. The ridges on the locking strips 26,40 are close together, providing for locking in substantially any position over their length.

The clip 10 is positioned just below the flanges 48 of the trunking 46, thereby maximising the capacity in the trunking 46 for any additional cabling 44 inserted into the trunking 46 subsequently. The position of the first member 12 with respect to the second member 14, in either the closed position, as shown in FIG. 1, or in the engaged position, is fixed or locked due to the resistance provided by cooperating locking strips 26 and 40. This locking action prevents the clip from falling out of the trunking in use.

Clips 10 are inserted along the length of the trunking 46 at spaced intervals as required. To complete the installation, a cover may be placed onto the trunking 46.

The profile of the clip 10 is beneficial as the clip 10 does not interfere with the attachment of the cover.

If vertical compartment dividers are used within the trunking 46 to separate types of cables 44 (e.g. data, lighting, telephone) or to separate cables 44 with different destinations in a building, the clip 10 may be positioned adjacent the trunking flanges 48, inside of the trunking 46, so as not to interfere with the vertical compartment divider.

The clip 10 can serve to hold cables, not only in channel section trunking, but also in other types of trunking, for example dado-trunking.

Furthermore, the clip 10 can also be used as a horizontal compartment divider. In this way, a plurality of clips 10 are inserted into the trunking 46 above cables 44 that are already in place and extended to reach the engaged position. Additional cables 44 are then added into the trunking above the clips 10. This use as a horizontal compartment divider facilitates cable organisation and helps the installer when it is desirable to separate cables according to type or destinations, as previously described.

The upper surface 24 of the first member 12 and the rear surface 39 of the second member 14 may be conveniently printed or labelled with the identification of the installer for reasons of traceability.

The clip is advantageous because it is adjustable in length across the open face of channel section trunking and therefore can be used on all standard and non-standard sized trunking. It is compact and slidably operable, thereby minimising the amount of space it occupies within the trunking, ensuring that the capacity for additional cables that may be installed subsequently is maximised. It is versatile and can be used in addition to or instead of compartment dividers.

The invention claimed is:

1. A channel section trunking with at least one adjustable clip for the retention of cables within the channel section trunking, the at least one adjustable clip comprising a first member and a second member, the first and second members being slidably moveable relative to one another for adjusting the length of the clip across the opening of the channel section trunking in use, and cooperating formations being provided on each of the first and second members enabling the locking together of the first and second members in substantially any relative position, and the channel section trunking having a rear wall, side walls, and internally facing flanges provided along the edges of the side walls, behind which the at least one adjustable clip can be retained.

2. A channel section trunking according to claim 1, wherein the first and second members each have a distal end for abutting a side wall of the trunking in use.

3. A channel section trunking according to claim 1, wherein the second member has a substantially U-shaped lateral cross-section, including a base and a pair of longitudinal flanges extending along respective edges of the base.

4. A channel section trunking according to claim 3, wherein a tongue is provided on each longitudinal edge of the first member and a corresponding recess is provided on an inner face of each longitudinal flange of the second member, each tongue sliding within a respective recess.

5. A channel section trunking according to claim 1, wherein the first and second members are substantially curved in lateral cross-section.

6. A channel section trunking according to claim 1, wherein the cooperating formations are a series of spaced ridges providing peaks and troughs, the peaks of the first member being nestable in the troughs of the second member.

7. A channel section trunking according to claim 6, wherein the series of ridges is provided each on a rear surface of the first member facing the second member and on a front surface of the second member facing the second member.

8. A channel section trunking according to claim 7, wherein a gripping formation is provided on the front surface of the first member for facilitating sliding of the first member relative to the second member.

9. A channel section trunking according to claim 8, wherein the gripping formation is a finger-well.

10. A channel section trunking according to claim 9, wherein the finger-well is integrally formed in the first member.

11. A channel section trunking according to claim 6, wherein each ridge in the series of ridges is a protrusion extending across a portion of the width of the clip, between each longitudinal edge of the first and second members respectively.

12. A channel section trunking according to claim 6, wherein each series of ridges is positioned centrally across the width of the clip.

13. A channel section trunking according to claim 12, wherein each series of ridges is symmetrical about the centre of the clip.

14. A channel section trunking according to claim 6, wherein each series of ridges extends along the entire length of the clip.

15. A channel section trunking according to claim 1, wherein the length of the first member is different to the length of the second member.

16. A channel section trunking according to claim 1, wherein the length of the first member is the same as the length of the second member.

\* \* \* \* \*